R. O. BEAN.
Seed-Planter.

No. 204,703. Patented June 11, 1878.

WITNESSES:
C. Neveux
C. Sedgwick

INVENTOR:
R. O. Bean
BY Munn & Co
ATTORNEYS.

UNITED STATES PATENT OFFICE.

RUSSEL O. BEAN, OF MACEDONIA, MISSISSIPPI.

IMPROVEMENT IN SEED-PLANTERS.

Specification forming part of Letters Patent No. 204,703, dated June 11, 1878; application filed April 12, 1878.

*To all whom it may concern:*

Figure 1:
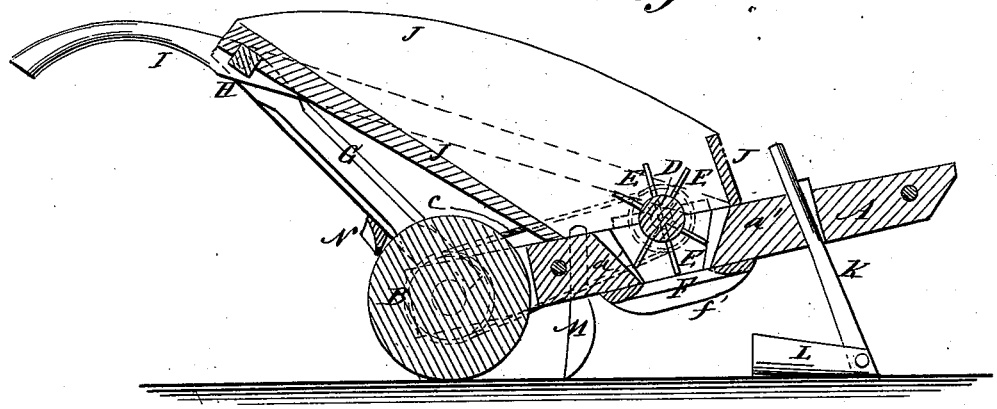
Figure 2:
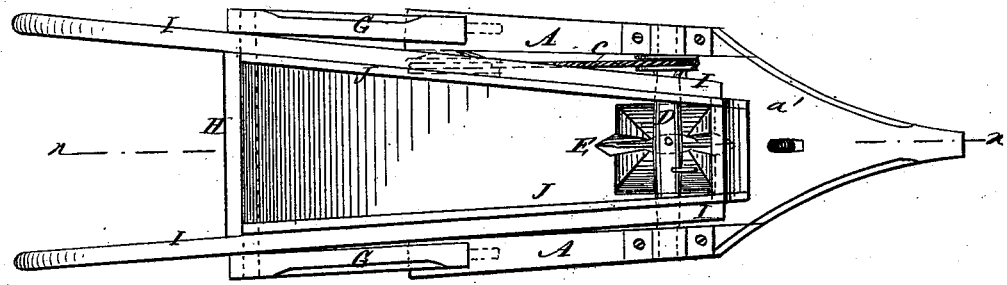
Figure 3:
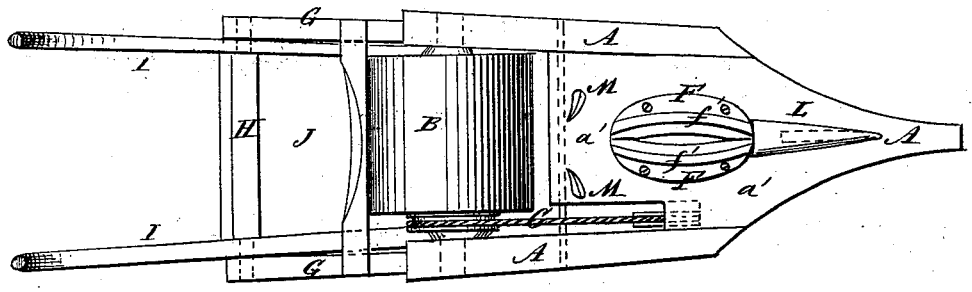

Be it known that I, RUSSEL O. BEAN, of Macedonia, in the county of Lee and State of Mississippi, have invented a new and useful Improvement in Seed-Planters, of which the following is a specification:

Figure 1 is a vertical longitudinal section of my improved seed-planter, taken through the line $x\ x$, Fig. 2. Fig. 2 is a top view of the same. Fig. 3 is an under-side view of the same.

Similar letters of reference indicate corresponding parts.

The object of this invention is to furnish an improved machine for planting cotton-seeds and other seeds, and for distributing fertilizers, which shall be simple in construction, convenient in use, inexpensive in manufacture, and effective in operation.

A is the frame of the machine, which is formed by attaching bars to the side edges of a wide board or plank, $a'$, which forms the platform of the machine, and the forward end of which is tapered to receive the draft.

To the rear end of the side bars of the frame A is pivoted a roller, B, which presses the soil down upon the seed and finishes covering it.

Around the journal of the roller B, or a pulley attached to or formed upon said journal, passes a band, C, which also passes around the pulley attached to the shaft D. The shaft D revolves in bearings attached to the forward part of the frame A, and to its middle part is attached a number of radial pins or arms, E, which draw the seed down into the hopper-shaped cavity formed in the platform $a'$, and force it through a slot in the said platform between the adjacent edges of the two plates F. The adjacent edges of the two plates F are slightly concaved, as shown in Fig. 3, and upon their under side are formed downwardly-projecting flanges $f'$, which serve as guides to the seeds and cause them to drop into the furrow made by the opener. The plates F are secured to the lower side of the platform $a'$ by screws or bolts, so that they may be adjusted farther apart or closer together, as more or less seed is required to be planted.

To the rear parts of the side bars of the frame A are attached the lower ends of the inclined standards G, the upper ends of which are connected by a cross-bar, H. To the upper ends of the standards G and the cross-bar H are attached the handles I, the forward ends of which are attached to the forward part of the side bars of the frame A.

J is the seed-hopper, the lower end of which surrounds the cavity in the platform $a'$, and its upper part inclines to the rearward and rests against and is secured to the cross-bar H and the handles I.

In a hole in the forward part of the platform $a'$ is secured the standard K of the opener, the foot L of which is made tapering and is made U-shaped in its cross section, so as to pack the sides of the furrow opened by the standard K and prevent the soil from falling in before the seed has been deposited in the said furrow.

To the rear part of the platform A are attached two coverers, M, to force the soil into the furrow and cover the seed, which soil is then pressed down and the covering completed by the roller B.

The standard K of the opener and the shanks of the coverer M are secured to the platform $a'$ adjustably, so that they may be adjusted to enter the ground to any desired depth.

To the rear sides of the standards G is attached a bar, N, in such a position as to scrape off any soil that may adhere to the face of the roller B, and thus keep it in proper working condition.

Having thus described my invention, I claim as new and desire to secure by Letters Patent—

The combination, with hopper and recessed platform, of the plates F, concaved on the sides and provided with downwardly-projecting flanges, as and for the purpose specified.

RUSSEL OWEN BEAN.

Witnesses:
H. C. MEDFORD,
T. A. PLEDGER.